Oct. 29, 1935.
C. C. BAUCOM
2,019,385
CLOVER SEED SOWER
Filed March 12, 1934
4 Sheets-Sheet 1
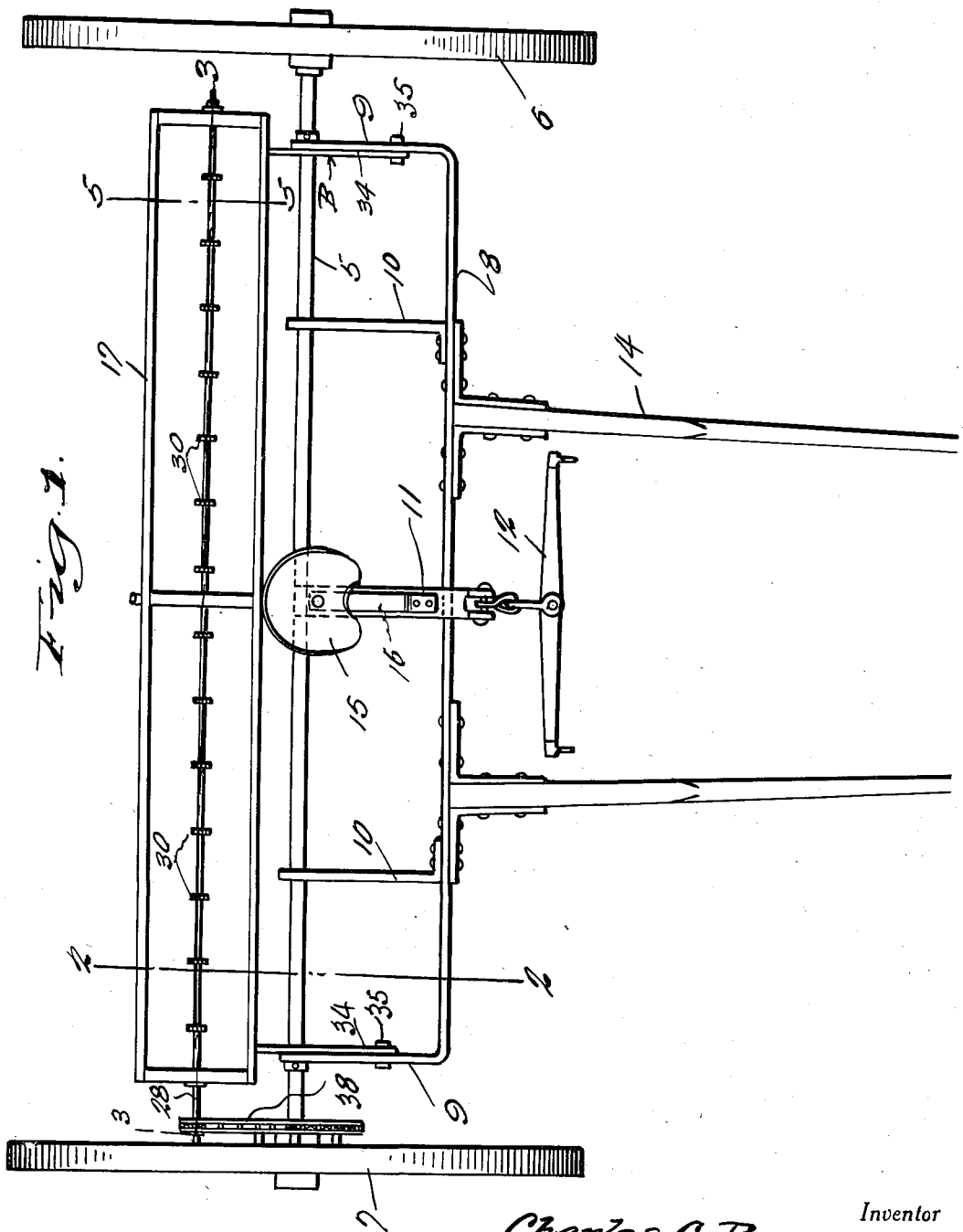
Inventor
Charles C. Baucom
By Clarence A. O'Brien
Attorney Oct. 29, 1935.　　　　C. C. BAUCOM　　　　2,019,385
CLOVER SEED SOWER
Filed March 12, 1934　　　　4 Sheets-Sheet 2
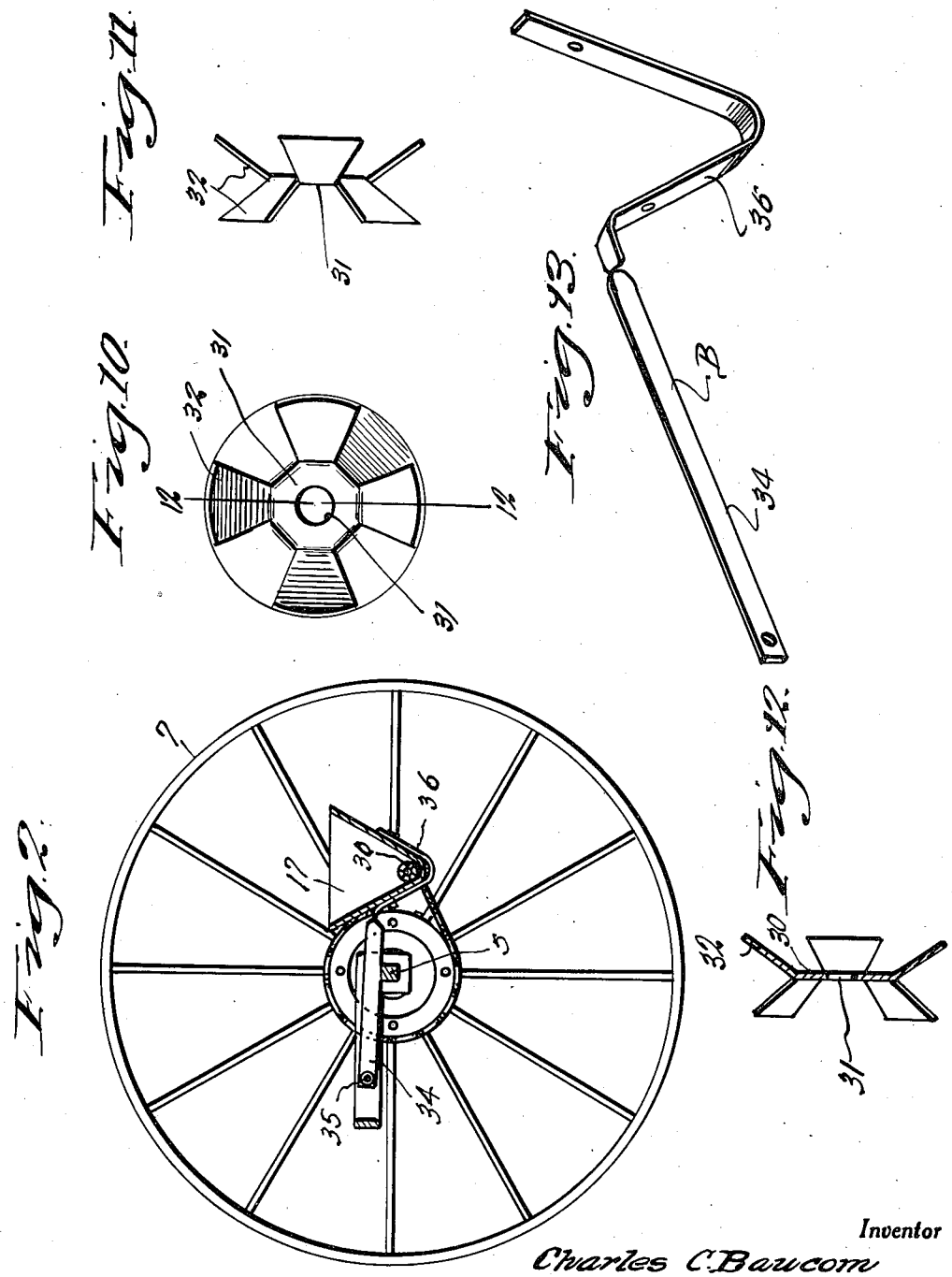
Inventor
Charles C. Baucom
By Clarence A. O'Brien
Attorney Oct. 29, 1935.　　　C. C. BAUCOM　　　2,019,385
CLOVER SEED SOWER
Filed March 12, 1934　　　4 Sheets-Sheet 3
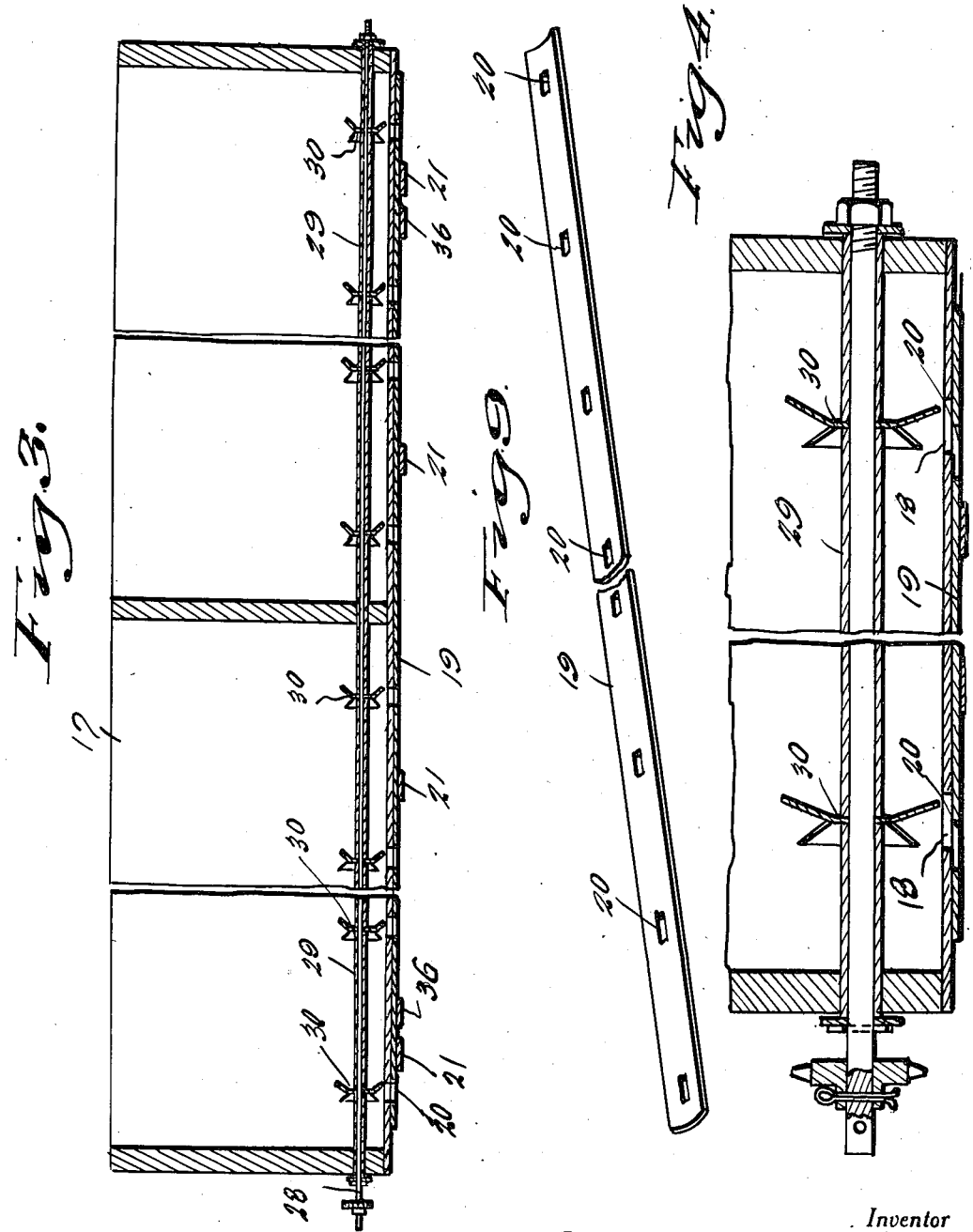
Inventor
Charles C. Baucom
By Clarence A. O'Brien
Attorney Oct. 29, 1935.  C. C. BAUCOM  2,019,385
CLOVER SEED SOWER
Filed March 12, 1934  4 Sheets-Sheet 4
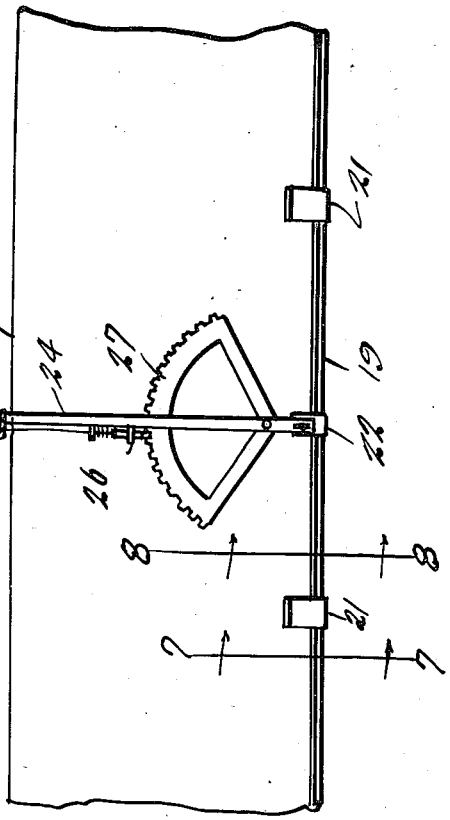
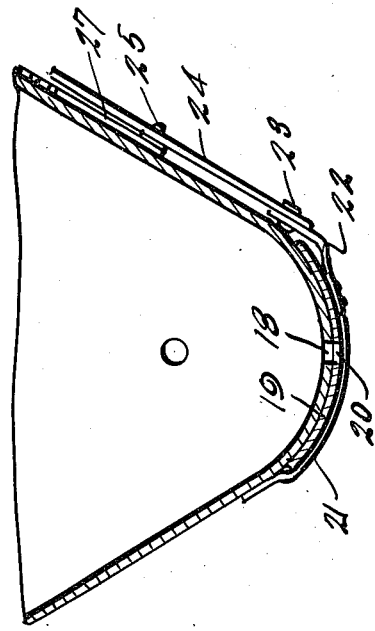
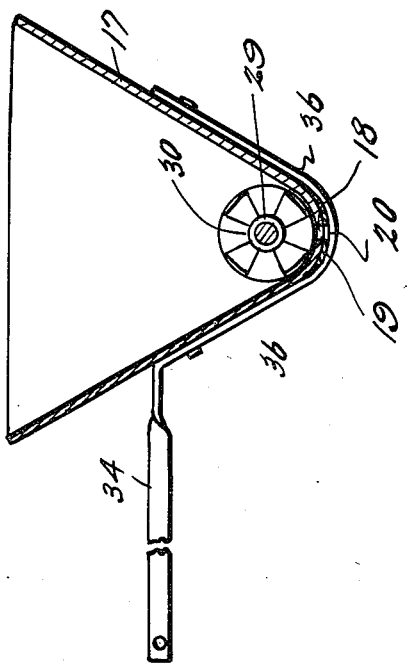
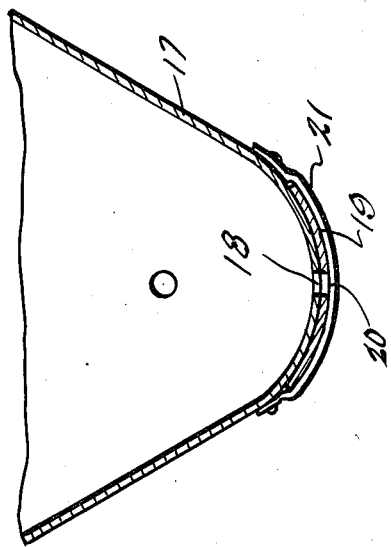
Inventor
Charles C Baucom
By Clarence A O'Brien
Attorney Patented Oct. 29, 1935

2,019,385

UNITED STATES PATENT OFFICE 2,019,385

CLOVER SEED SOWER

Charles C. Baucom, Monroe, N. C.

Application March 12, 1934, Serial No. 715,221

1 Claim. (Cl. 221—130)

The present invention relates to a machine for sowing clover seed particularly of the Lespedeza or Japan variety and the object of the invention is to provide a machine of this nature which is simple in its construction, comparatively inexpensive to construct, thoroughly efficient and reliable in operation and otherwise well adapted to the purpose for which it is designed.

Another important object of the invention resides in the provision of a machine of this nature having a highly efficient and novel feed device.

With the above and numerous other objects in view as will appear as the description proceeds, the invention consists in certain novel features of construction, and in the combination and arrangement of parts as will hereinafter be more fully described and claimed.

In the drawings:

Figure 1 is a top plan view of a machine embodying the features of my invention.

Figure 2 is a vertical transverse section taken substantially on the line 2—2 of Figure 1.

Figure 3 is a vertical transverse section taken substantially on the line 3—3 of Figure 1.

Figure 4 is a similar view but fragmentary and on an enlarged scale.

Figure 5 is a detail vertical section taken substantially on the line 5—5 of Figure 1 through the feed hopper showing one of the brackets.

Figure 6 is a fragmentary rear elevation of the central portion of the feed box showing the regulating lever.

Figure 7 is a detail section taken substantially on the line 7—7 of Figure 6.

Figure 8 is a detail section taken substantially on the line 8—8 of Figure 6.

Figure 9 is a perspective view of the valve plate.

Figure 10 is a detail side elevation of one of the feed disks.

Figure 11 is an edge view thereof.

Figure 12 is a sectional view therethrough taken substantially on the line 12—12 of Figure 10, and Figure 13 is a perspective view of one of the brackets.

Referring to the drawing in detail it will be seen that the numeral 5 denotes an axle on the ends of which are rotatable wheels 6 and 7. The frame comprises an elongated cross portion 8 disposed in advance of the axle and parallel thereto and having integral end portions 9 extending rearwardly and through the ends of which the axle 5 extends. Bars 10 are secured to the portion 8 of the frame and extend rearwardly and through the rear ends thereof of the axle 5 extends. A central longitudinal bar 11 has the central portion of the axle 5 extending therethrough and this bar 11 crosses the center of the frame portion 8 and is fixed thereto and a whiffle tree 12 is secured to the front end of the central bar. A pair of shafts 14 are secured to the frame portion 8 one to each side of the bar 11 so that this two-wheeled frame may be hauled by a single horse or other animal. A seat 15 is mounted on a spring support 16 secured to the central bar 11.

Numeral 17 denotes the hopper which is disposed transversely and is oblong in construction and substantially V-shaped in section as shown in Figures 6 to 8 inclusive. The bottom portion of the hopper is provided with openings 18. An elongated plate 19 is provided with openings 20 to be brought into registry with the openings 18. This plate 19 is slidably mounted in straps 21 secured to the hopper 17 as shown to advantage in Figure 7. To shift the valve plate 19 a strap 22 is secured thereto and has a pin and slot connection 23 with a lever 24 pivoted as at 25 and having a detent 26 thereon to cooperate with a notched segment 27.

A shaft 28 is journalled through the ends from the central portion of the hopper 17 as shown to advantage in Figures 3 and 4 and above each opening 18 on the shaft 28 is disposed a distributing disk. These disks are held in proper spaced relation by spacing sleeve 29. Referring particularly to Figures 10 to 12 inclusive it will be seen that each disk comprises a body 30 having a central opening 31 and on the periphery of the body are a plurality of wings 32 which extend at obtuse angles from the body alternately in opposite directions. As will be seen, each wing has flat faces and each wing is disconnected from adjacent wings and both edges of each wing lie at the same angle to the plane of the hub portion and on the same side of the hub.

The hopper is mounted in a plurality of brackets B, preferably two in number. Each bracket comprises an arm 34 the forward end of which is bolted as at 35 to an intermediate portion of a member 9 and rests on the axle 5 and extends rearwardly thereof and terminates in a V-shaped portion 36 which receives the hopper and is bolted thereto.

A chain and sprocket mechanism 38 operatively connects the shaft 28 with the wheel 7. The rotation of the wheel 7 thus causes rotation of the shaft 28 and its distributing disks. These rotating disks gather the seeds toward the openings 18 to gravitate therethrough. The flow of the seeds is controlled by the plate 19.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a sower of the class described, a hopper having discharge openings in its bottom, a shaft rotatably arranged in the lower part of the hopper, and a plurality of disks on the shaft, one above each opening, each disk including a hub portion and a plurality of wings, alternate wings extending diagonally in one direction and the other wings extending diagonally in an opposite direction, each wing having flat parallel faces, the side edges of each wing being disconnected from the side edges of adjacent wings and each side edge of one wing forming a V-shaped recess with the adjacent side edge of the adjacent wing and both edges of each wing lying at the same angle to the plane of the hub portion and on the same side of the hub, the extremities of the wings passing over the openings adjacent the end walls of said openings.

CHARLES C. BAUCOM.